United States Patent
Graziosi et al.

(10) Patent No.: US 11,095,900 B2
(45) Date of Patent: Aug. 17, 2021

(54) POINT CLOUD CODING STRUCTURE

(71) Applicant: SONY CORPORATION, Tokyo (JP)

(72) Inventors: Danillo Graziosi, San Jose, CA (US); Ohji Nakagami, Tokyo (JP); Ali Tabatabai, Cupertino, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/408,124

(22) Filed: May 9, 2019

(65) Prior Publication Data

US 2020/0204808 A1 Jun. 25, 2020

Related U.S. Application Data

(60) Provisional application No. 62/821,139, filed on Mar. 20, 2019, provisional application No. 62/791,328, filed on Jan. 11, 2019, provisional application No. 62/787,637, filed on Jan. 2, 2019, provisional application No. 62/781,968, filed on Dec. 19, 2018.

(51) Int. Cl.
*H04N 19/159* (2014.01)
*G06K 9/62* (2006.01)
*G06T 7/33* (2017.01)
*G06T 7/38* (2017.01)

(52) U.S. Cl.
CPC ......... *H04N 19/159* (2014.11); *G06K 9/6211* (2013.01); *G06T 7/344* (2017.01); *G06T 7/38* (2017.01)

(58) Field of Classification Search
None
See application file for complete search history.

(56) References Cited

U.S. PATENT DOCUMENTS

| 9,237,356 B2 | 1/2016 | Wang et al. | |
| 2017/0347100 A1 | 11/2017 | Chou et al. | |
| 2019/0197739 A1* | 6/2019 | Sinharoy | G06K 9/6218 |
| 2020/0107028 A1* | 4/2020 | Vosoughi | H04N 19/597 |
| 2020/0107033 A1* | 4/2020 | Joshi | H04N 19/20 |
| 2020/0111237 A1* | 4/2020 | Tourapis | G06T 9/001 |
| 2020/0137416 A1* | 4/2020 | Esenlik | H04N 19/533 |
| 2020/0186830 A1* | 6/2020 | Seregin | H04N 19/105 |

* cited by examiner

*Primary Examiner* — Frederick D Bailey
(74) *Attorney, Agent, or Firm* — Haverstock & Owens LLP

(57) ABSTRACT

A point cloud coding structure defines a "key" point cloud frame, where all references used for predicting point cloud patches are limited to the current point cloud frame. A point cloud patch buffer is described, where the list of reference patches and their respective bounding boxes from a point cloud frame are stored to be used for prediction of patches in another frame. The list of reference patches may contain patches from the past and patches from the future, in case the coding order of point cloud frames is allowed to be different from the presentation order, and bi-directional prediction is used. A similar reference buffer list concept is able to be applied to the layers of the point cloud. A signaling method that correlates the blocks of V-PCC by signaling within the payload the reference to the ID of the block containing the higher-level information is also described.

14 Claims, 9 Drawing Sheets

POINT CLOUD CODING STRUCTURE

CROSS-REFERENCE TO RELATED APPLICATION(S)

This application claims priority under 35 U.S.C. § 119(e) of the U.S. Provisional Patent Application Ser. No. 62/821,139, filed Mar. 20, 2019 and titled, "POINT CLOUD CODING STRUCTURE," U.S. Provisional Patent Application Ser. No. 62/791,328, filed Jan. 11, 2019 and titled, "POINT CLOUD CODING STRUCTURE," U.S. Provisional Patent Application Ser. No. 62/787,637, filed Jan. 2, 2019 and titled, "POINT CLOUD CODING STRUCTURE," U.S. Provisional Patent Application Ser. No. 62/781,968, filed Dec. 19, 2018 and titled, "POINT CLOUD CODING STRUCTURE," which are hereby incorporated by reference in their entireties for all purposes.

FIELD OF THE INVENTION

The present invention relates to three dimensional graphics. More specifically, the present invention relates to coding of three dimensional graphics.

BACKGROUND OF THE INVENTION

Point clouds have been considered as a candidate format for transmission of 3D data, either captured by 3D scanners, LIDAR sensors, or used in popular applications such as Virtual Reality/Augmented Reality (VR/AR). Point Clouds are a set of points in 3D space. Besides the spatial position (X,Y,Z), each point usually has associated attributes, such as color (R,G,B) or even reflectance and temporal timestamps (e.g., in LIDAR images). In order to obtain a high fidelity representation of the target 3D objects, devices capture point clouds in the order of thousands or even millions of points. Moreover, for dynamic 3D scenes used in VR/AR application, every single frame often has a unique dense point cloud, which results in the transmission of several millions of point clouds per second. For a viable transmission of such a large amount of data, compression is often applied.

In 2017, MPEG issued a call for proposal (CfP) for compression of point clouds. After evaluation of several proposals, MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. The method has proven to be more efficient than native 3D coding and is able to achieve competitive bitrates at acceptable quality.

When coding point clouds, TMC2 encodes auxiliary information related to the patch projection, such as patch position in the 2D canvas image and bounding box size. For temporal coding of auxiliary information, patch matching between patches from current point cloud and patches from the immediately decoded point cloud is used for prediction. The procedure is limited to the immediate neighbor and includes performing delta coding for all the frames in the sequence.

SUMMARY OF THE INVENTION

A point cloud coding structure defines a "key" point cloud frame, where all references used for predicting point cloud patches are limited to the current point cloud frame. A point cloud patch buffer is described, where the list of reference patches and their respective bounding boxes from a point cloud frame are stored to be used for prediction of patches in another frame.

The list of reference patches may contain patches from the past and patches from the future, in case the coding order of point cloud frames is allowed to be different from the presentation order, and bi-directional prediction is used. A similar reference buffer list concept is able to be applied to the layers of the point cloud. A signaling method that correlates the blocks of V-PCC by signaling within the payload the reference to the ID of the block containing the higher-level information is also described.

In one aspect, a method programmed in a non-transitory memory of a device comprises implementing a point cloud coding structure and encoding point cloud metadata using the point cloud coding structure. Implementing the point cloud coding structure includes determining key point cloud frames which do not depend on any other frames for prediction. Encoding the point cloud metadata utilizes bi-directional prediction, wherein bi-direction prediction includes using past patch and metadata information and future patch and metadata information. Bi-directional prediction implements two separate structures, a first structure for the past patch and metadata information, and a second structure for the future patch and metadata information. The first structure and the second structure are stored in a point cloud patch buffer. The method further comprises utilizing a buffer list for layers of the point cloud to enable points of a point cloud to be projected on top of each other. The method further comprises implemented a signaling method to correlate blocks of V-PCC.

In another aspect, an apparatus comprises a non-transitory memory for storing an application, the application for: implementing a point cloud coding structure and encoding point cloud metadata using the point cloud coding structure and a processor coupled to the memory, the processor configured for processing the application. Implementing the point cloud coding structure includes determining key point cloud frames which do not depend on any other frames for prediction. Encoding the point cloud metadata utilizes bi-directional prediction, wherein bi-direction prediction includes using past patch and metadata information and future patch and metadata information. Bi-directional prediction implements two separate structures, a first structure for the past patch and metadata information, and a second structure for the future patch and metadata information. The first structure and the second structure are stored in a point cloud patch buffer. The method further comprises utilizing a buffer list for layers of the point cloud to enable points of a point cloud to be projected on top of each other. The apparatus further comprises implemented a signaling method to correlate blocks of V-PCC.

In another aspect, a system comprises a point cloud coding structure and an encoder for encoding point cloud metadata using the point cloud coding structure. Implementing the point cloud coding structure includes determining key point cloud frames which do not depend on any other frames for prediction. Encoding the point cloud metadata utilizes bi-directional prediction, wherein bi-direction prediction includes using past patch and metadata information and future patch and metadata information. Bi-directional prediction implements two separate structures, a first structure for the past patch and metadata information, and a second structure for the future patch and metadata information. The first structure and the second structure are stored in a point cloud patch buffer. The system further comprises utilizing a buffer list for layers of the point cloud to enable points of a point cloud to be projected on top of each other. The system further comprises implemented a signaling method to correlate blocks of V-PCC.

DETAILED DESCRIPTION OF THE PREFERRED EMBODIMENT

Figure 1:
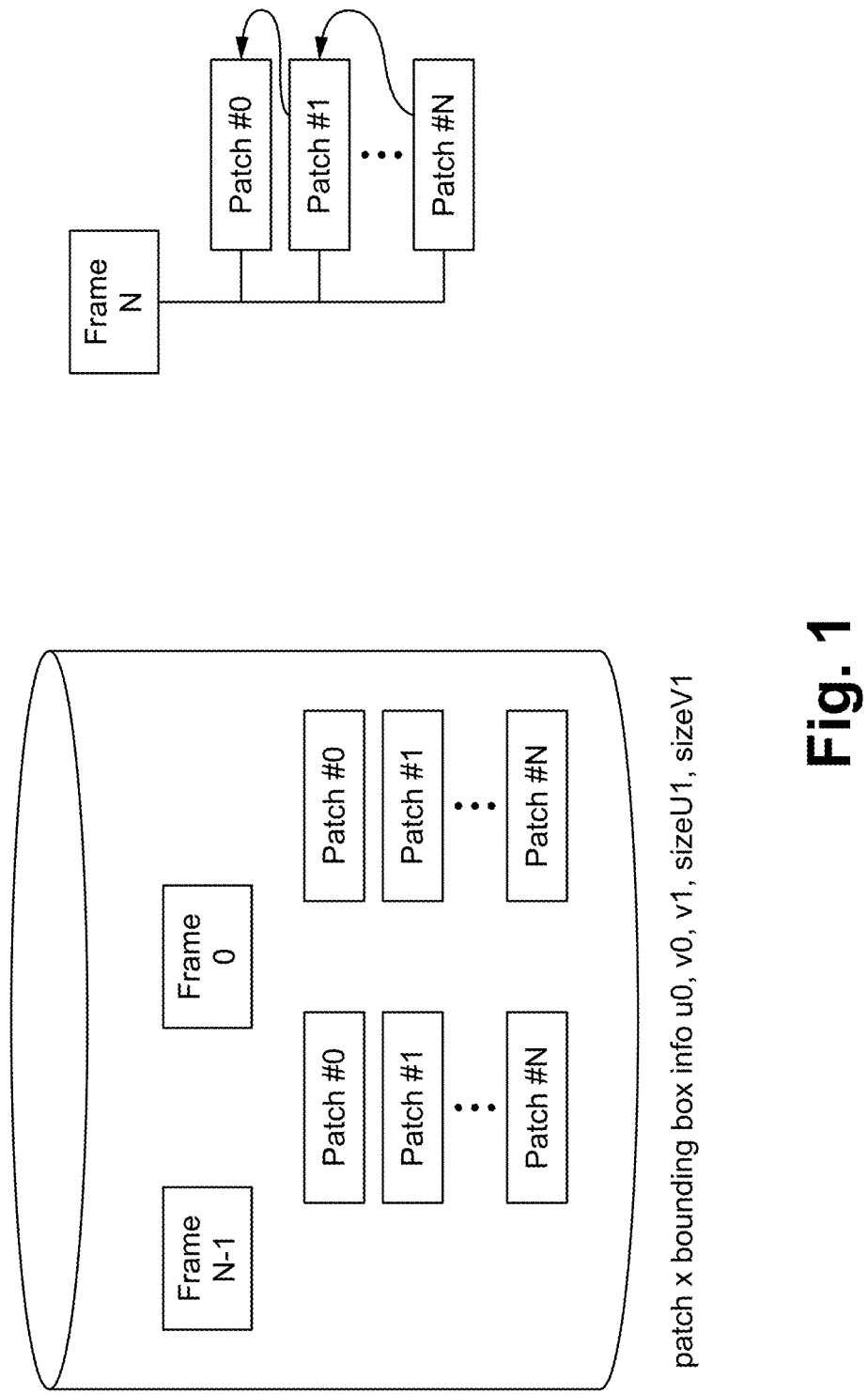
FIG. 1 illustrates a diagram of an auxiliary information buffer for a "key" point cloud frame according to some embodiments.

A novel coding structure for temporal compression of dynamic point clouds is described herein. The coding structure defines a concept of a "key" point cloud frame, where all references used for predicting point cloud patches are limited to the current point cloud frame. Furthermore, the point cloud patch buffer is described herein, where the list of reference patches and their respective bounding boxes from a point cloud frame are stored to be used for prediction of patches in another frame. The list of reference patches may contain patches from the past as well as patches from the future, in case the coding order of point cloud frames is allowed to be different from the presentation order, and bi-directional prediction is used. A similar reference buffer list concept is able to be applied to the layers of the point cloud. A signaling method that correlates the blocks of V-PCC by signaling within the payload the reference to the ID of the block containing the higher-level information is also described herein.

A buffer containing the metadata information (patches and respective bounding boxes) stores the data from previous frames. Then, to encode the current frame, the encoder performs patch matching between the current frame and the patches stored from a previous frame.

Furthermore, the patches can be matched with two or more patches from two or more previous frames, which may or may not be located in the future. To allow bi-directional prediction, the reference patch list is able to be stored in two separate lists, one indicating frames in the past, while another indicates frames in the future. In case a "key" point cloud frame is defined, prediction using past point cloud frames is not allowed, and all the references used should come from the current frame. Furthermore, the signaling structure of V-PCC units shall contain a reference to elements in a higher level. For instance, the block containing information for Attribute Patch Parameter Set (APPS) references a block that contains the information of the Attribute Parameter Set (APS), which is done by means of IDs.

A list of past information to predict current information is described herein, similar to the Decoded Picture Buffer (DPB) used in video encoders such as HEVC. The novelty of the technique is to use the reference list to encode metadata information (patches), instead of using it to encode images only. Moreover, a method of signaling that indicates within the payload the reference to blocks with higher-level information is described herein.

The point cloud coding structure described herein includes information related to new elements added to a point cloud coding standard to make the structure more efficient. The information included provides relationships and how to encode and decode point cloud compressed bitstreams.

In the point cloud coding standard, a point cloud is segmented into surface patches, and the surface patches are projected. The projection generates 2D images which are able to be encoded with one or more 2D video encoders. Auxiliary information (or metadata) is sent which indicates how to generate the 2D images and how to reconstruct the 2D images from the 3D image or vice versa (e.g., mapping information such as how to go from a 3D point to a 2D video). For example, a point cloud is divided into 100 patches, which means there is metadata describing how to go from the point cloud to the patches or how to go from the patches in 3D to the patches in 2D. The metadata includes properties such as temporal correlation between frames. The metadata (e.g., temporal correlation information) is encoded. For example, one frame of a point cloud is divided into 100 patches, and one patch is the face patch, which is all of the points on the face grouped into a single patch. The next frame includes the point cloud slightly shifted, and this time, the point cloud is divided into 110 patches, where two patches represent the face. A list of patches per frame is able to be correlated with lists of patches from other frames. For example, the auxiliary information includes 3D information such as position information (e.g., position 10) of a patch, and that the position information (e.g., position 11) of the patch in a second frame is different/changed. The new position is not needed to be encoded; rather, the relationship of the new patch compared to the old patch is encoded (e.g., patch from second frame is position p+1 in this example). Thus, these connections/correlations between patches between frames are able to be stored. Although the example discusses a current frame and a previous frame, any frames are able to be used and correlated.

A buffering structure is able to be generated for the auxiliary information such that a patch is temporally correlated to a patch in a previous frame of a frame that is five frames ago. The buffering structure indicates all of the dependencies of the patches and frames. Then, different types of auxiliary information are able to be generated such as auxiliary information that does not depend on any previous frame, which is similar to a key frame. A patch that depends on frames from the past includes temporal prediction. Bi-directional prediction is able to be implemented where frames are not encoded sequentially but rather the frames are re-ordered so that a patch is able to refer to patches in the past and the future, which allows more flexibility.

FIG. 1 illustrates a diagram of an auxiliary information buffer for a "key" point cloud frame according to some embodiments. For a "key" point cloud frame, the auxiliary information for each patch is from previous patches within the same frame. Auxiliary information from additional frames is not utilized.

Figure 2:
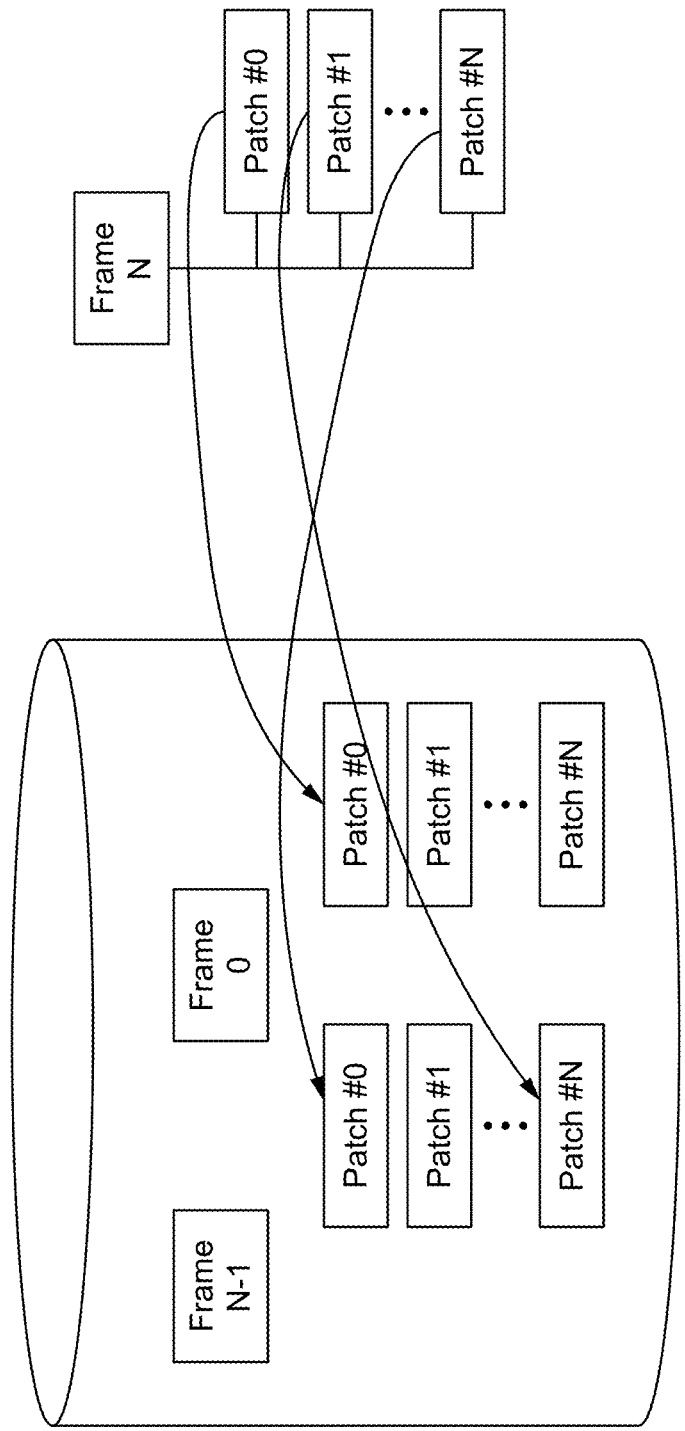
FIG. 2 illustrates a diagram of an auxiliary information buffer utilizing temporal prediction according to some embodiments.

FIG. 2 illustrates a diagram of an auxiliary information buffer utilizing temporal prediction according to some embodiments. For temporal prediction, the auxiliary information for a patch is able to come from patches from previous frames (e.g., $Frame_{N-1}$ ... $Frame_0$).

Figure 3:
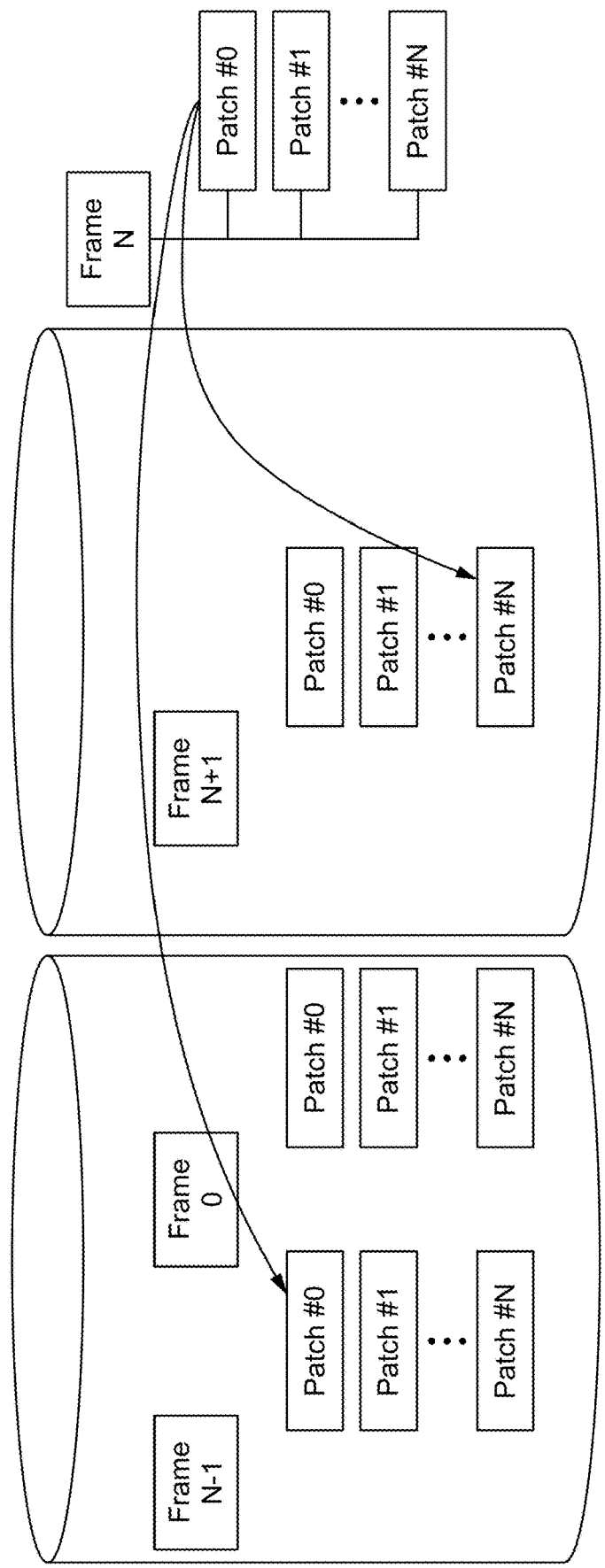
FIG. 3 illustrates a diagram of an auxiliary information buffer utilizing bi-directional prediction according to some embodiments.

FIG. 3 illustrates a diagram of an auxiliary information buffer utilizing bi-directional prediction according to some embodiments. For bi-directional prediction, the auxiliary information for a patch is able to come from patches from previous frames (e.g., $Frame_{N-1}$ ... $Frame_0$) or from future frames (e.g., $Frame_{N+1}$).

Given the delta/differential nature of auxiliary information, the limitation with the current TMC2 matching approach is that only the previous auxiliary information data unit is used as the reference. A more flexible prediction scheme for current auxiliary information data unit is to create a reference list from a set of predefined reference auxiliary information set (RAIS). An example of reference auxiliary information set and the list for LD is provided in FIG. 3.

The example in FIG. 3 shows a simple implementation using the concept of a reference set and list. It however provides the flexibility to generate a predefined set of reference auxiliary information sets according to GOP configuration of geometry video codec by use of bi-prediction for random access and introduction of an L1 type reference list in addition to L0. In addition, the current scheme is able to be further extended and generalized such that matched patches in the current frame are able to refer to a different reference frame index.

For the video layer buffer, when points are projected from the 3D plane to the 2D plane, there are some points that are projected on top of each other. To preserve the points, video layers are able to be implemented, where the first layer is the first point, the second layer is the second point and so on. In some implementations, only two layers are utilized, where the first layer is the first point and the second layer is the last point, and any points in between are not coded. In some implementations, additional layers (e.g., 16 layers) are able to be utilized.

Specifically, in the current V-PCC specification there could be up to a maximum of 16 layers, whereas in TMC2 SW implementation number of layers is limited to two only. In addition, a flag "absolute_d1_flag" is used to generate either a single interleaved layer0/layer1 input (absolute_d1_flag=1), or two inputs ((absolute_d1_flag=0): layer 0 and a residual (layer_1-layer_0) to the geometry video codec. When dealing with more than two layers signaling the prediction order will become more complicated. Therefore, extending the concept of reference auxiliary information sets and lists to multi-layers provides a unified way to deal with both cases.

Figure 4:
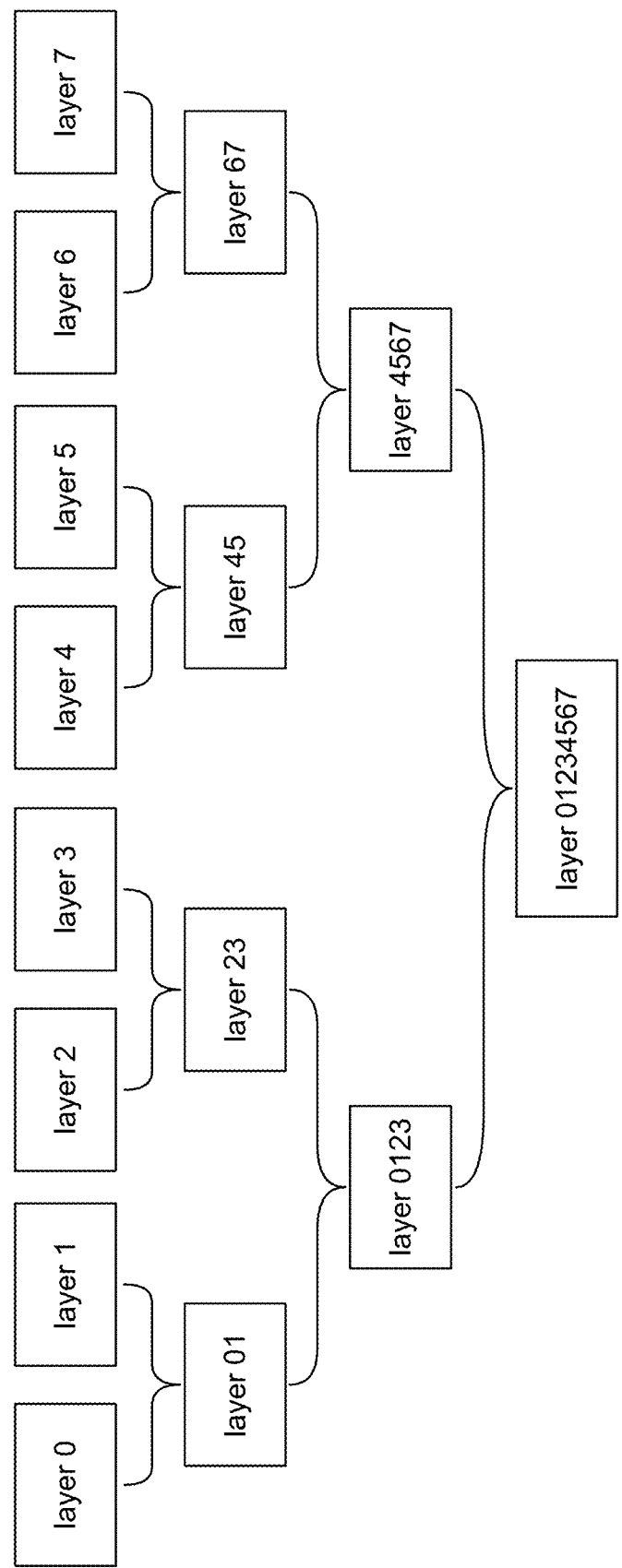
FIG. 4 illustrates a diagram of a hierarchical grouping of layers according to some embodiments.

A FIFO buffer is able to be implemented to allow more than two layers (slices from 3D plane) to be utilized. The FIFO buffer is able to indicate which layers have previously been encoded. The layers are also able to be grouped hierarchically to generate a prediction scheme which is hierarchical. For example, layers are combined into hierarchical groups, and the hierarchical groups are able to be used for prediction. FIG. 4 illustrates a diagram of a hierarchical grouping of layers according to some embodiments.

An alternative way to create a single/two layer is the hierarchical grouping of the layers to generate either a two layer or a single layer scheme in line with current TMC2 implementation. Information for such grouping could be fixed/predefined or sent to the decoder.

Figure 5:
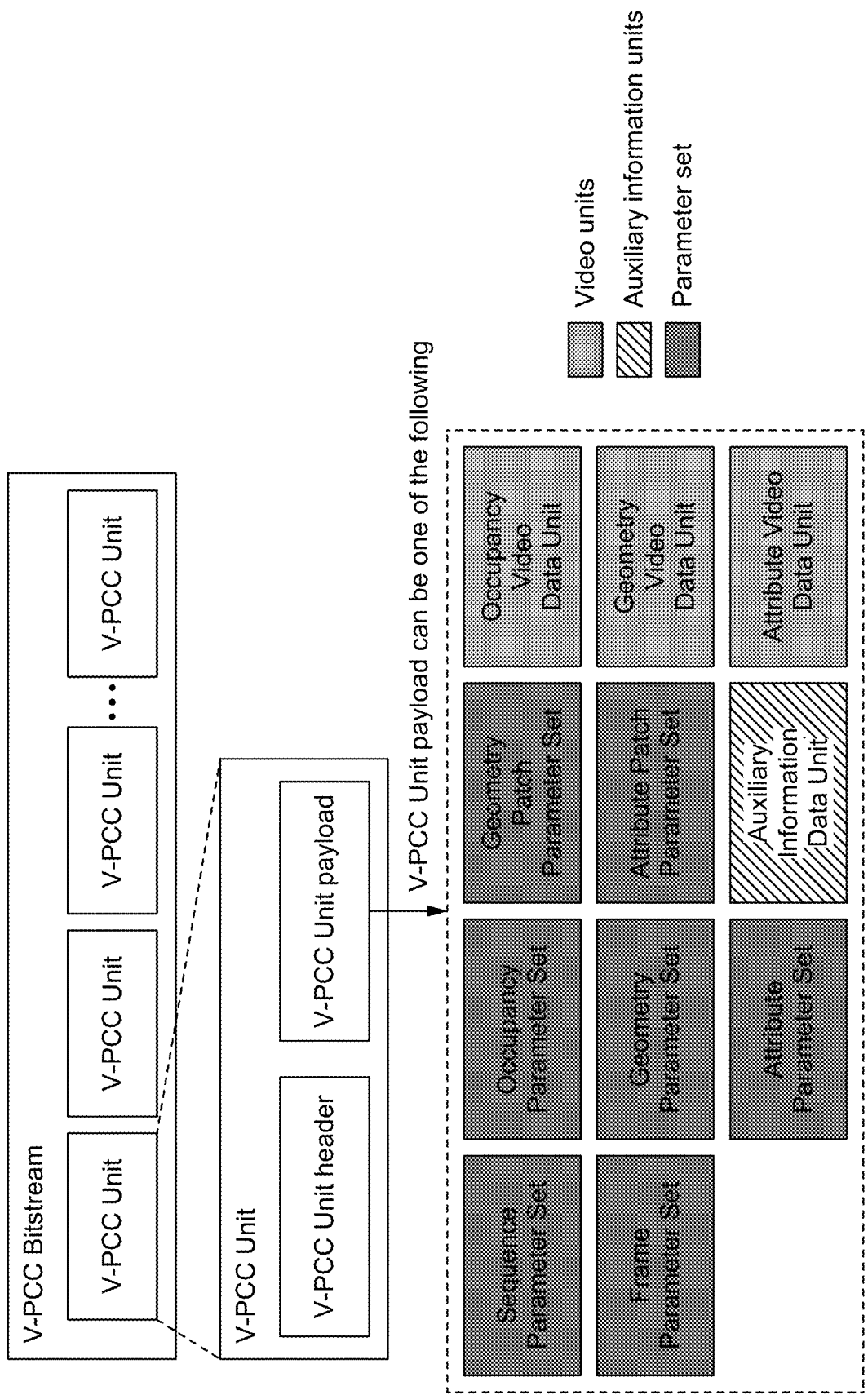
FIG. 5 illustrates a diagram of V-PCC signaling according to some embodiments.

FIG. 5 illustrates a diagram of V-PCC signaling according to some embodiments. The V-PCC bitstream includes V-PCC units, and each V-PCC unit includes a V-PCC unit header and a V-PCC unit payload. The V-PCC unit payload can be any of the following: sequence parameter set, occupancy parameter set, geometry patch parameter set, occupancy video data unit, frame parameter set, geometry parameter set, attribute patch parameter set, geometry video data unit, attribute parameter set, auxiliary information data unit, or attribute video data unit.

Signaling is able to be included with the V-PCC bitstream for each V-PCC unit to generate a logical chain for each V-PCC unit. For example, the geometry patch parameter set is able to be connected to the sequence parameter set. The signaling is able to include information connecting the V-PCC units.

Figure 6:
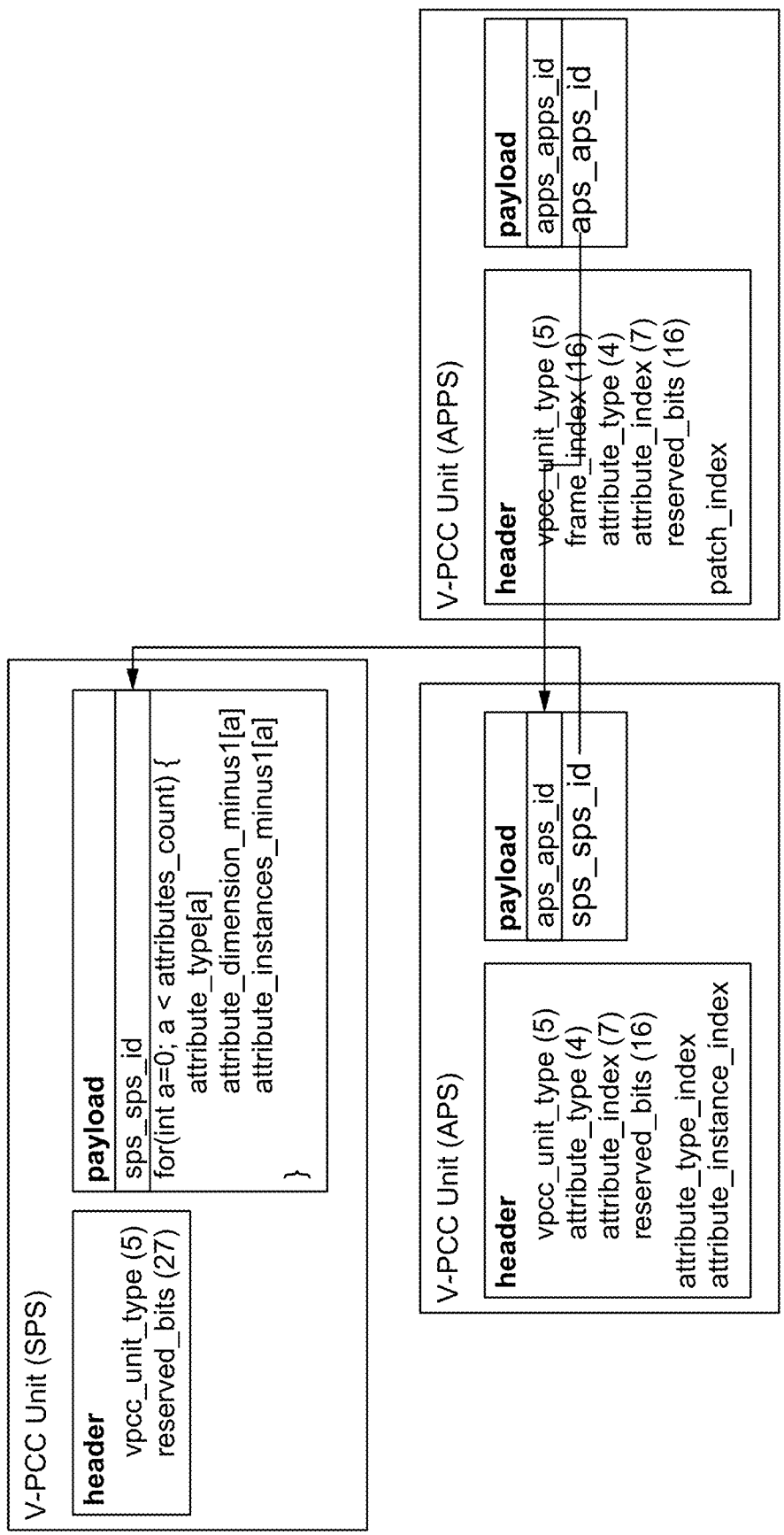
FIGS. 6-8 illustrate exemplary coding of V-PCC signaling including logical chain information according to some embodiments.
Figure 7:
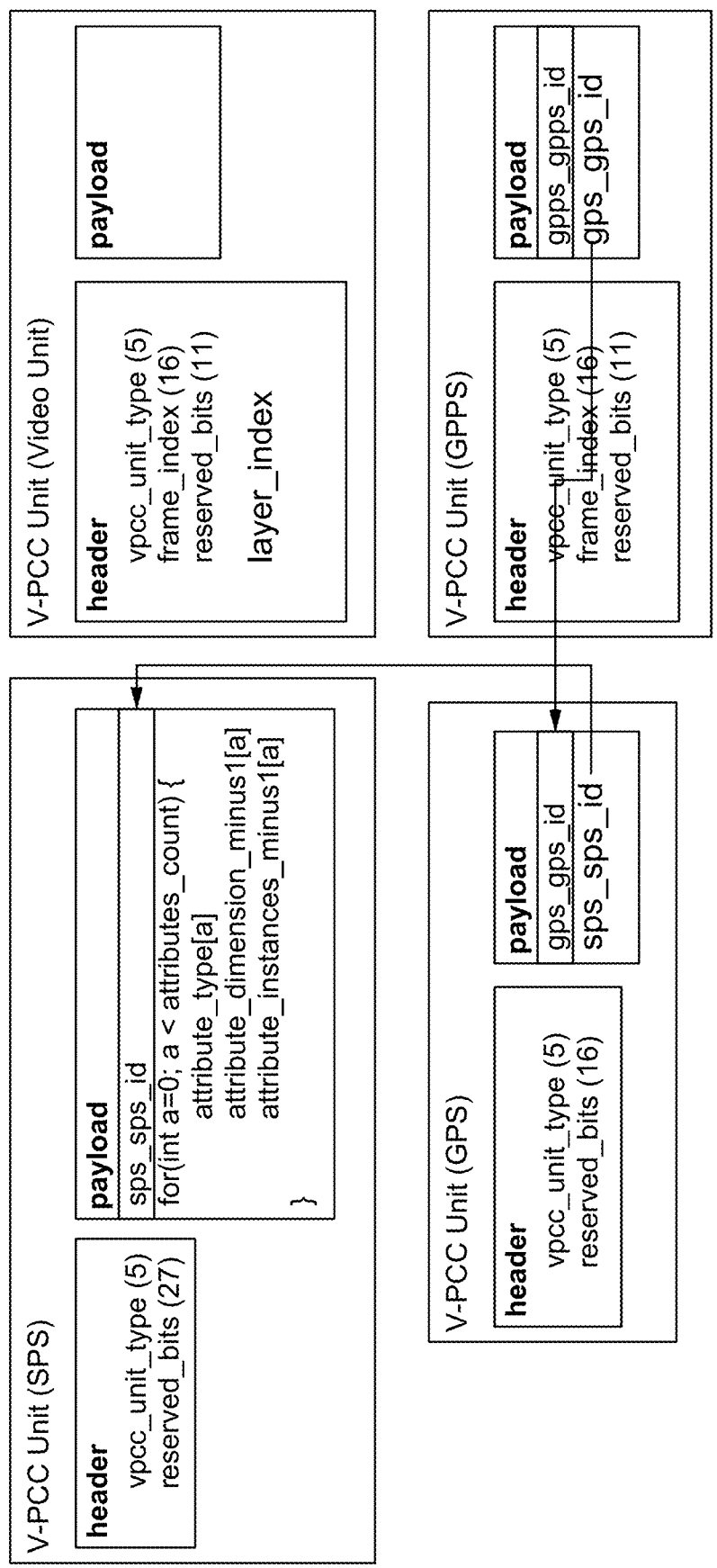
Figure 8:
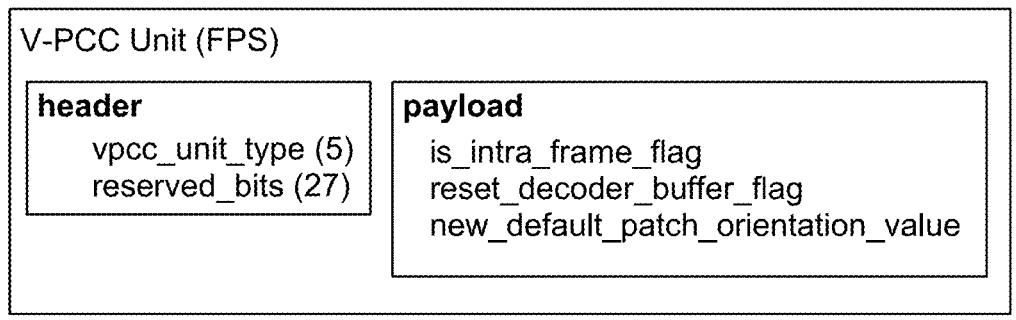

FIGS. 6-8 illustrate exemplary coding of V-PCC signaling including logical chain information according to some embodiments. The sequence parameter set (sps) defines parameters that are valid for an entire sequence. The ID of the sequence parameter set is sps_sps_id. The attribute parameter set (aps) defines parameters for a specific attribute. The attribute parameter set is connected to a sequence parameter set which is indicated by the aps_aps_id and the sps_sps_id in the payload. A library of parameters or conditions is able to be generated, and then using the signaling/ID, selections from the library are able to be made. As shown in FIG. 8, the frame parameter set unit is able to be used to send information such as indication of intra frame, metadata information to reset the decoder buffer, informing the decoder, a new default value for the patch orientation and more.

Since sps payload has a global scope it may signal the type of attribute(s), corresponding dimension(s) (this information may implicitly derived from a table), and number of instances for each attribute.

A video data unit in the current TMC2 SW is Group of Frame (GoF) specific and is not following the CD syntax specification.

Since the order in which layer 0 and layer 1 are interleaved is not specified in the current draft, a default order may be specified. That may put a constraint on the encoder if fixed and cannot be changed. By introducing a layer_index value in the header, it becomes possible to code the layers in a more flexible order.

Adding of "parameter set id" is able to support: a more compact way to represent a group of patches with similar/common features (scale, offset e.g. ROI) without the need to signal metadata information for each patch; error resiliency, and harmonization: use of parameter set IDs are well established in HEVC/AVC. TMC13 uses similar concept.

Since the GoF concept is introduced in TMC2 but not supported in the current draft, there still exists a need for a mechanism by which one can identify random access points within frames (closed or open GOPs) somewhat similar to an HEVC "IDR" or "CRA" pictures. An implementation includes: using the frame parameter set unit to carry information such as: 1) indication of an IRAP (intra random access point e.g., IDR, CRA), 2) metadata information to reset the decoder buffer and 3) others, such as resetting the default values. Since, in case of CRA (open GOP), output order and decoding order are not necessarily the same, its use depends on whether re-ordering of auxiliary information inputs are allowed.

The following is exemplary code:

|  | Descriptor |
|---|---|
| sequence_parameter_set( ) { | |
|     profile_idc | u(7) |
|     tier_flag | u(1) |
|     level_idc | u(8) |
|     frame_width | u(16) |
|     frame_height | u(16) |
|     additional_points_patch_enabled_flag | u(1) |
|     if ( additional_points_patch_enabled_flag ) { | |
|         additional_points_separate_video_enabled_flag | u(1) |
|     } | |
|     auxiliary_information_delta_coding_enabled_flag | u(1) |
|         auxiliary_information_flexible_orientation_enabled_flag | u(1) |
|         layer_count_minus1 | u(4) |
|         layer_ref_enabled_flag | u(1) |
|         num_layer_ref_sets | u(4) |
|         for( i = 0; i < num_layer_ref_sets;_i++) | |
|             rlayer_ref_sets(i) | |
|     attribute_count | u(16) |
|     geometry_metadata_enabled_flag | u(1) |
|     if ( geometry_metadata_enabled_flag ) { | |
|         geometry_smoothing_metadata_enabled_flag | u(1) |
|         geometry_scale_metadata_enabled_flag | u(1) |
|         geometry_offset_metadata_enabled_flag | u(1) |
| frame_parameter_set ( ) { | Descriptor |
|     byte_alignment ( ) | |
| } | |

The following is exemplary code:

|  | Descriptor |
|---|---|
| auxiliary_information_data_unit( ) { | |
|     patch_count_minus1 | u(32) |
|     if(auxiliary_information_orientation_enabled_flag) { | |
|         auxiliary_information_patch_orientation_present_flag | u(1) |
|     } | |
|     patch_2d_shift_u_bit_count_minus1 | u(8) |
|     patch_2d_shift_v_bit_count_minus1 | u(8) |
|     patch_3d_shift_tangent_axis_bit_count_minus1 | u(8) |
|     patch_3d_shift_bitangent_axis_bit_count_minus1 | u(8) |
|     patch_3d_shift_normal_axis_bit_count_minus1 | u(8) |
|     patch_lod_bit_count_minus1 | u(8) |
|     if( auxiliary_information_delta_coding_enabled_flag_&& pc_frame_type != IDR \|\| != CRA ){ | |
|         use_bit_count_for_unmatched_patch_enabled_flag | u(1) |
|         if( bit_count_for_unmatched_patch_enabled_flag ) { | |
|             inherit_patch_2d_shift_u_bit_count_for_unmatched_patch_flag | u(1) |
|             if( inherit_patch_2d_shift_u_bit-count_for_unmatched_patch_flag ){ | |
|                 unmatched_patch_2d_shift_u_bit_count_minus1 | u(8) |
|             } | |
|             inherit_patch_2d_shift_v_bit_count_for_unmatched_patch_flag | u(1) |
|             if( inherit_patch_2d_shift_v_bit_count_for_unmatched_patch_flag ){ | |
|                 unmatched_patch_2d_shift_v_bit_count_minus1 | u(8) |
|             } | |
|             inherit_patch_3d_shift_tangent_axis_bit_count_for_unmatched_patch_flag | u(1) |
|             if( inherit_patch_3d_shift_tangent_axis_bit_count_for_unmatched_patch_flag ){ | |
|                 unmatched_patch_3d_shift_tangent_axis_bit_count_minus1 | u(8) |
|             } | |
|             inherit_patch_3d_shift_bitangent_axis_bit_count_for_unmatched_patch_flag | u(1) |
|             if( inherit_patch_3d_shift_bitangent_axis_bit_count_for_unmatched_patch_flag ){ | |
|                 unmatched_patch_3d_shift_bitangent_axis_bit_count_minus1 | u(8) |
|             } | |

| | Descriptor |
|---|---|
| inherit_patch_3d_shift_normal_axis_bit_count_for_unmatched_patch_flag | u(1) |
| if( inherit_patch_3d_shift_normal_axis_bit_count_for_unmatched_patch_flag ){ | |
| unmatched_patch_3d_shift_normal_axis_bit_count_minus1 | u(8) |
| } | |
| } | |
| for( p = 0; p < matched_patch_count; p++ ) { | |
| delta_patch_index[ p ] | ae(v) |
| delta_patch_2d_shift_u[ p ] | se(v) |
| delta_patch_2d_shift_v[ p ] | se(v) |
| delta_patch_3d_shift_tangent_axis[ p ] | se(v) |
| delta_patch_3d_shift_bitangent_axis[ p ] | se(v) |
| delta_patch_3d_shift_normal_axis[ p ] | se(v) |
| if( geometry_absolute_coding_enabled_flag ) | |
| patch_projection_mode[ p ] | ae(v) |
| delta_patch_2d_size_u[ p ] | se(v) |
| delta_patch_2d_size_v[ p ] | se(v) |
| } | |
| for( p = matched_patch_count; p <= patch_count_minus1; p++ ) { | |
| patch_2d_shift_u[ p ] | ae(v) |
| patch_2d_shift_v[ p ] | ae(v) |
| if(auxiliary_information_flexible_orientation_present_flag) | |
| patch_orientation_index[ p ] | ae(v) |
| patch_3d_shift_tangent_axis[ p ] | ae(v) |
| patch_3d_shift_bitangent_axis[ p ] | ae(v) |
| patch_3d_shift_normal_axis[ p ] | ae(v) |
| patch_lod[ p ] | ae(v) |
| if( geometry_absolute_coding_enabled_flag ) | |
| patch_projection_mode[ p ] | ae(v) |
| delta_patch_2d_size_u[ p ] | se(v) |
| delta_patch_2d_size_v[ p ] | se(v) |
| normal_axis[ p ] | ae(v) |
| } | |
| } | |
| byte_alignment( ) | |
| } | |

In a committee draft, the semantic of "sps_attribute_count" is specified as: sps_attribute_count indicates the number of attributes associated with the point cloud. sps_attribute_count shall be in the range of 0 to 65535, inclusive. The semantics of sps_attribute_count seems to indicate the total number of attribute instances for each attribute associated with the point cloud. Subsequently, the syntax table below shows that for the same attribute type, "attribute_parameter_set( )" structure is being called repeatedly for each attribute instance despite the fact that some (or maybe even all or a group) of "attribute_parameter_set( )" syntax elements such as "aps_attribute codec_id," "aps_attribute_dimension_minus1" could remain unchanged.

Sequence Parameter Set Syntax

| | Descriptor |
|---|---|
| sps_attribute_count<br>for (i = 0; i < sps_attribute_count; i++)<br>   attribute_parameter_set (i) | u(16) |

An alternative definition may exist which refers to the number of attribute types, as shown below, rather than attribute instances. With this latter interpretation, the range of sps_attribute_count values shall be in the range of 0 to 15. Accordingly, the following changes to the syntax table are able to be implemented.

V-PCC Unit Header Syntax

| | Descriptor |
|---|---|
| vpcc_unit_header | |
| ................................... | |
| if (vpcc_unit_type = = VPCC_AVD) { | |
|    vpcc_attribute_type_index | u(4) |
|    vpcc_attribute_instance_index | u(7) |
| ................................... | |

Sequence Parameter Set Syntax

| | Descriptor |
|---|---|
| sps_attribute_type_count<br>for (i = 0; i < sps_attribute_type_count; i++)<br>   attribute_parameter_set (i) | u(4) |

Attribute Parameter Set Syntax

|  | Descriptor |
|---|---|
| attribute_parameter_set (attributeTypeIndex) { | |
|     aps_attribute_dimension_minus1[attributeTypeIndex] | u(8) |
|     attributeDimension = aps_attribute_dimension_minus1[attributeTypeIndex] + 1 | |
|     aps_attribute_type_id[attributeTypeIndex] | u(4) |
|     aps_attribute_codec_id[attributeTypeIndex] | u(8) |
|     aps_attribute_instance_count[attributeTypeIndex] | u(7) |
|     attInstCnt = aps_attribute_instance_count [attributeTypeIndex] | |
|         if(attrInstCnt > 1) | |
|             aps_attribute_group_present_flag[attributeTypeIndex] | u(1) |
|         if(aps_attribute_group_present_flag [attributeTypeIndex]) | |
|             aps_attribute_group_count_minus1[attributeTypeIndex] | u(7) |
|     attrGrpCnt = aps_attribute_group_count_minus1[attributeTypeIndex] + 1 | |
|     for (i = 0; i < attrGrpCnt; i++) { | |
|         for (j = 0; attrGrpCnt > 1 && j < attrInstCnt; j++) | |
|             aps_attribute_group_instance_map [attributeTypeIndex][i][j] | u(1) |
|         aps_attribute_params_enabled_flag[attributeTypeIndex][i] | u(1) |
|         if(aps_attribute_params_enabled_flag[attributeTypeIndex][i]) | |
|             attribute_sequence_params(i, attributeDimension) | |
|         aps_attribute_patch_params_enabled_flag[attributeTypeIndex][i] | u(1) |
|         if(aps_attribute_patch_params_enabled_flag[attributeTypeIndex][i]) { | |
|             aps_attribute_patch_scale_params_enabled_flag[attributeTypeIndex][i] | u(1) |
|             aps_attribute_patch_offset_params_enabled_flag[attributeTypeIndex][i] | u(1) |
|         } | |
|     } | |
| } | | vpcc_attribute_type_index indicates the index to the attribute type associated with the point cloud. sps_attribute_type_index shall be in the range of 0 to 15, inclusive.

vpcc_attribute_instance_index indicates the instance index of the attribute data carried in the Attribute Video Data unit. The value of vpcc_attribute_index shall be in the range of 0 to 127, inclusive.

sps_attribute_type count indicates the number of attribute types associated with the point cloud. sps_attribute_type count shall be in the range of 0 to 15, inclusive.

aps_attribute_instance_count[i] indicates the number of attribute instances of attribute type i associated with the point cloud. aps_attribute_instance_count shall be in the range of 0 to 127, inclusive.

aps_attribute_group_present_flag[i] equal to 1 indicates that attribute instances associated with attribute type i, are grouped. aps_attribute_group_flag[i] equal to 0 indicates that attribute instances associated with attribute type i, are not grouped. When aps_attribute_group_present_flag[i] is not present, its value shall be inferred to be equal to 0.

aps_attribute_group_count_minus1[i]+1 indicates the number of attribute instance groups associated with attribute type i. aps_attribute_group_count[i] shall be in the range of 1 to 127, inclusive. When aps_attribute_group_count_minus1[i] is not present, its value shall be inferred to be equal to 0.

aps_attribute_group_instance_map[i][j][k] indicates whether attribute instance k belongs to attribute instance group j associated with attribute type i. aps_attribute_group_instance_map[i][j][k] shall be in the range 0 to 1. When aps_attribute_group_instance_map[i][j][k] is not present, its value shall be inferred to be equal to 1. When aps_attribute_group_instance_map[i][j][k] is not present it is inferred that all attribute instances are mapped into a single group.

The above changes establish correspondence between "vpcc_attribute_index" and "vpcc_attribute_type" at vpcc_unit_header( ), provides flexibility as to whether all the instances of the same attribute type share similar attribute parameter set or in groups, and activates attribute_parameter_set( ) syntax structure based on attribute type.

Tight Bounding Between Geometry and Attributes Layers

In the committee draft, the number of layers between geometry and attribute is similar. This thus limits the flexibility of dealing with cases whereas an attribute may not necessarily have the same number of layers as the geometry. A simple example is the case of an attribute with dimensions greater than three. A second example could be that attribute layers may be interleaved into a single layer versus a multilayer geometry or vice versa.

To support such flexibility, the following changes are made in the syntax table:

Attribute Parameter Set Syntax

|  | Descriptor |
|---|---|
| attribute_parameter_set( attributeIndex { | |
|     aps_attribute_type_id[attributeIndex] | u(4) |
|     aps_attribute_dimension_minus1[ attributeIndex ] | u(8) |
|     aps_attribute_codec_id[ attributeIndex ] | u(8) |
|     aps_attribute_layer_count_present_flag[ attributeIndex ] | u(1) |
|     if( asp_attribute_layer_count_present_flag[ attributeIndex ] ) { | |
|         asp_attribute_layer_abs_delta_count_minus1[ attributeIndex ] | u(2) |
|     asp_attribute_layer_count_sign_flag [ attributeIndex ] | u(1) |
|     } | |
|     aps_attribute_patch_params_enabled_flag[ attributeIndex ] | u(1) |
|     if(aps_attribute_patch_params_enabled_flag[ attributeIndex ] ) { | |
|         aps_attribute_patch_scale_params_enabled_flag[ attributeindex ] | u(1) |
|         aps_attribute_patch_offset_params_enabled_flag[ attributeIndex ] | u(1) |
|     } | |
| } | | aps_attribute_layer_count_present_flag[i] equal to 1 indicates that the number of attribute layers is not the same as "sps_layer_count_minus1+1" for attribute with index i. aps_attribute_layer_count_present_flag[i] equal to 0 indicates that number of attribute layers is the same as "sps_layer_count_minus1+1" for attribute with index i.

asp_attribute_layer_abs_delta_count_minus1[i]+1 specifies the absolute difference between number of attribute layers for attribute with index i and sps_layer_count. The value of asp_attribute_layer_abs_delta_count_minus1[i] shall be in the range of 0 to 3, inclusive. When not present, the value asp_attribute_layer_abs_delta_count_minus1[i] is inferred to be equal to 1.

asp_attribute_layer_count_sign_flag[i] equal to 1 specifies that asp_attribute_layer_abs_delta_count_minus1[i]+1 has a value greater than 0. asp_attribute_layer_count_sign_flag[i] equal to 0 specifies that asp_attribute_layer_abs_delta_count_minus1[i]+1 has a value less than 0. When not present, the value of asp_attribute_layer_count_sign_flag[i] is inferred to be equal to 0.

Changes for the attribute decoding process are reflected herein:

If sps_attribute_count is equal to 0, no attribute video frames are decoded, and no attribute information is associated with the final, reconstructed point cloud.

attributeLayerCount=(sps_layer_count_minus1+1)+
        asp_attribute_layer_count_sign_flag[vpcc_attribute_index]*(asp_attribute_layer_abs_
        delta_count_minus1[vpcc_attribute_index]+1)

Otherwise (if sps_attribute_count is not equal to 0), the following applies:

If attributeLayerCount is equal to 0, an sps_attribute_count number of video decoding processes are invoked each with a different vpcc_attribute_index associated with it, and the associated codec specified by aps_attribute_codec_id [vpcc_attribute_index] as the input. Outputs of this process are the decoded and display/output ordered attribute video frames, AttrFrame[attrIdx][layerIdx] [orderIdx][compIdx][y][x], and their associated bitdepth, AttrBitdepth[attrIdx][layerIdx][orderIdx], width, AttrWidth [attrIdx][layerIdx][orderIdx], and height, AttrHeight[attrIdx][layerIdx][orderIdx], information, where attrIdx corresponds to the attribute index and is in the range of 0 to sps_attribute_count−1, inclusive, layerIdx corresponds to the layer index and is equal to 0, orderIdx is the display order index of the decoded attribute frames, compIdx corresponds to the attribute component index and is in the range of 0 to aps_attribute_dimension_minus1[attrIdx−1], y is in the range of 0 to AttrHeight[attrIdx][layerIdx][orderIdx]−1, inclusive, and x is the column index in the decoded frame and is in the range of 0 to AttrWidth[attrIdx][layerIdx][orderIdx]−1, inclusive.

Otherwise (sps_layer_count_minus1 is not equal to 0), the following applies:

If sps_multiple_layer_streams_present_flag is equal to 0, an sps_attribute_count number of video decoding processes are invoked, each with a different vpcc_attribute_index associated with it, and the associated codec specified by aps_attribute_codec_id[vpcc_attribute_index] as the input. Outputs of this process are the decoded and display/output ordered intermediate attribute video frames, tempAttrFrame [attrIdx][tempOrderIdx][compIdx][y][x], and their associated bitdepth, tempAttrBitdepth[attrIdx][tempOrderIdx], width, tempAttrWidth[attrIdx][tempOrderIdx ], and height, tempAttrHeight[attrIdx][tempOrderIdx] information, where attrIdx corresponds to the attribute index and is in the range of 0 to sps_attribute_count−1, inclusive, tempOrderIdx is the display order index of all the decoded attribute frames, compIdx corresponds to the attribute component index and is in the range of 0 to aps_attribute_dimension_minus1 [attrIdx−1], y is in the range of 0 to tempAttrHeight[attrIdx] [tempOrderIdx]−1, inclusive, and x is the column index in the decoded frame and is in the range of 0 to tempAttrWidth [attrIdx][tempOrderIdx]−1, inclusive. The decoded attribute video frames for attribute with index attrIdx, at display/output order orderIdx for each layer are then derived as follows:

```
for (i = 0; i <= sps_layer_count_minus1; i++ ){
    mappedIdx = orderIdx * attributeLayerCount) + i
    AttrBitdepth[ attrIdx ][ i ][ orderIdx ] = tempAttrBitdepth[ attrIdx ][ mappedIdx ]
    AttrWidth[ attrIdx ][ i ][ orderIdx ] = tempAttrWidth[ attrIdx ][ mappedIdx ]
```

-continued

```
AttrHeight[ attrIdx ][ i ][ orderIdx ] = tempAttrHeight[ attrIdx ][ mappedIdx ]
AttrFrame[ attrIdx ][ i ][ orderIdx ] = tempAttrFrame[ mappedIdx ]
}
```

Finally, for clarity and ease of interpretation "vpcc_geometry_layer_index" and "vpcc_attribute_layer_index" are used rather than "vpcc_layer_index" for both.

Single and Multiple Bitstreams for Geometry and Attributes sps_multiple_layer_streams_present_flag equal to 0 indicates that all geometry or attribute layers are placed in a single geometry or attribute video stream, respectively.

sps_multiple_layer streams_present_flag equal to 1 indicates that all geometry or attribute layers are placed in separate video streams. When sps_multiple_layer_streams_present_flag is not present, its value shall be inferred to be equal to 0.

Based on the semantic above, the intention is to bound tightly single/multiple layer streams between geometry and attribute layers. To allow flexibility for future extensions, one option is to define sps_multiple_layer_streams_present_flag separately for geometry and attribute (e.g., sps_multiple_geometry_layer_streams_present_flag and sps_multiple_attribute_layer_streams_present_flag with default of sps_multiple_geometry_layer_streams_present_flag=sps_multiple_attribute_layer_streams_present_flag).

Figure 9:
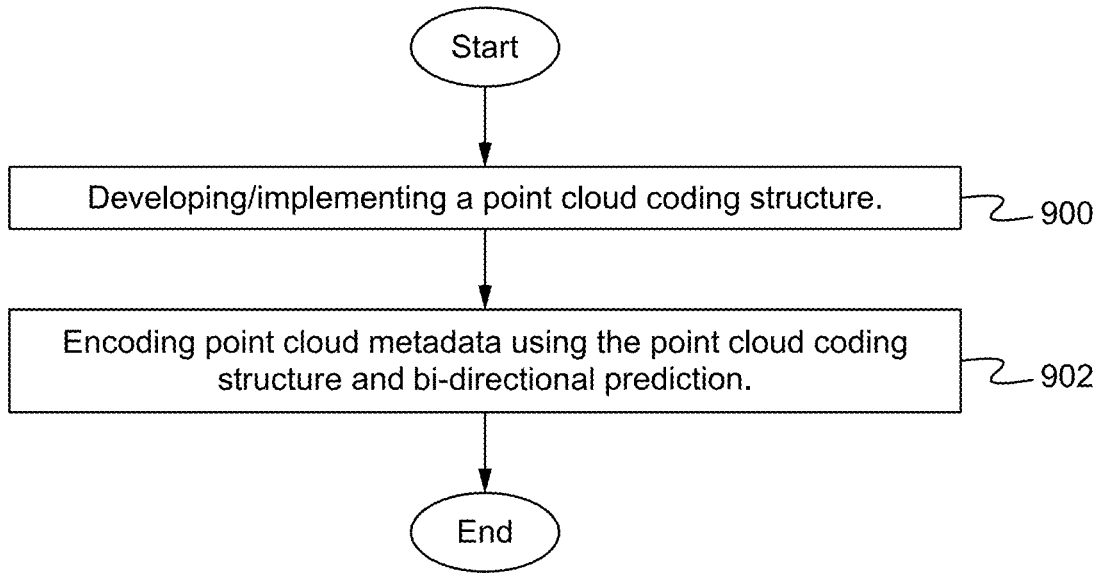
FIG. 9 illustrates a flowchart of a method of implementing a point cloud coding structure according to some embodiments.

Geometry Sequence Parameter Syntax geometry_parameter_set( )/attribute_parameter_set( ) versus geometry_sequence_params( )/attribute_sequence_params( ) ordering. In the current syntax, the calling order of the above syntax structures is as follows:

sequence_parameter_set→geometry/attribute_parameter_set→geometry/attribute_sequence_params or sequence_parameter_set→geometry/attribute_sequence_params→geometry/attribute_parameter_set FIG. 9 illustrates a flowchart of a method of implementing a point cloud coding structure according to some embodiments. In the step 900, the point cloud coding structure is developed/implemented. Developing and implementing the point cloud coding structure includes determining "key" point cloud frames. Key point cloud frames are frames which do not depend on any other frames for prediction.

In the step 902, bi-directional prediction is used for encoding. Bi-direction prediction is implemented using two separate structures (e.g., lists) for storing past and future information such as patch information and/or metadata information, and when performing prediction, the prediction is able to be made using past information and/or future information. The structures are able to be stored in a point cloud patch buffer. A buffer list is utilized for layers of the point cloud to enable points of a point cloud to be projected on top of each other. Additionally, a signaling method is implemented to correlate blocks of V-PCC. In some embodiments, fewer or additional steps are implemented. For example, the step of decoding is also implemented. In some embodiments, the order of the steps is modified.

Figure 10:
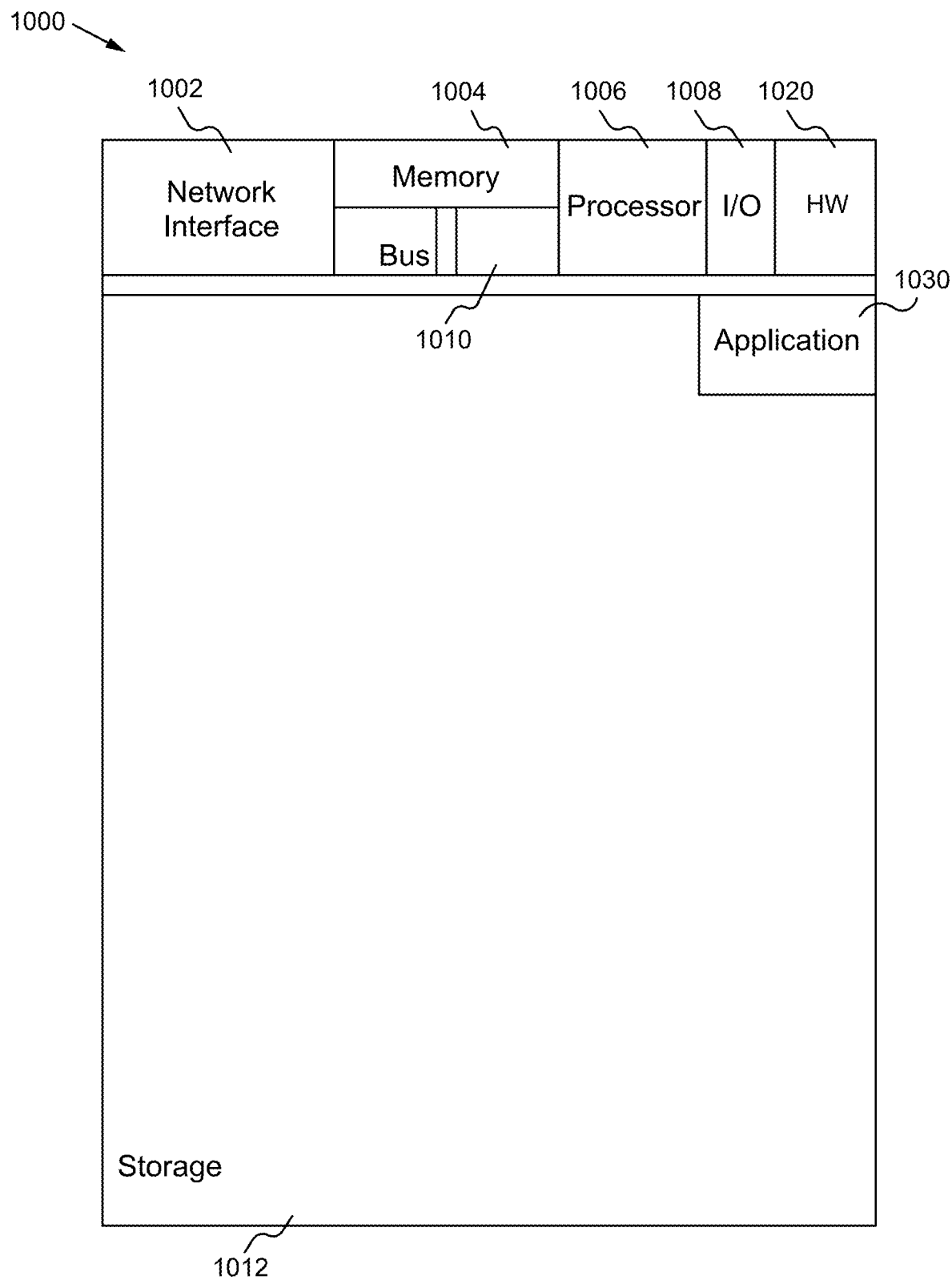
FIG. 10 illustrates a block diagram of an exemplary computing device configured to implement the point cloud coding structure according to some embodiments.

FIG. 10 illustrates a block diagram of an exemplary computing device configured to implement the point cloud coding structure according to some embodiments. The computing device 1000 is able to be used to acquire, store, compute, process, communicate and/or display information such as images and videos including 3D content. The computing device 1000 is able to implement any of the point cloud coding structure aspects. In general, a hardware structure suitable for implementing the computing device 1000 includes a network interface 1002, a memory 1004, a processor 1006, I/O device(s) 1008, a bus 1010 and a storage device 1012. The choice of processor is not critical as long as a suitable processor with sufficient speed is chosen. The memory 1004 is able to be any conventional computer memory known in the art. The storage device 1012 is able to include a hard drive, CDROM, CDRW, DVD, DVDRW, High Definition disc/drive, ultra-HD drive, flash memory card or any other storage device. The computing device 1000 is able to include one or more network interfaces 1002. An example of a network interface includes a network card connected to an Ethernet or other type of LAN. The I/O device(s) 1008 are able to include one or more of the following: keyboard, mouse, monitor, screen, printer, modem, touchscreen, button interface and other devices. Point cloud coding structure application(s) 1030 used to implement the point cloud coding structure are likely to be stored in the storage device 1012 and memory 1004 and processed as applications are typically processed. More or fewer components shown in FIG. 10 are able to be included in the computing device 1000. In some embodiments, point cloud coding structure hardware 1020 is included. Although the computing device 1000 in FIG. 10 includes applications 1030 and hardware 1020 for the point cloud coding structure, the point cloud coding structure is able to be implemented on a computing device in hardware, firmware, software or any combination thereof. For example, in some embodiments, the point cloud coding structure applications 1030 are programmed in a memory and executed using a processor. In another example, in some embodiments, the point cloud coding structure hardware 1020 is programmed hardware logic including gates specifically designed to implement the point cloud coding structure.

In some embodiments, the point cloud coding structure application(s) 1030 include several applications and/or modules. In some embodiments, modules include one or more sub-modules as well. In some embodiments, fewer or additional modules are able to be included.

In some embodiments, the point cloud coding structure hardware 1020 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the point cloud coding structure described herein, a device acquires or receives 3D content and processes and/or sends the content in an optimized manner to enable proper, efficient display of the 3D content. The point cloud coding structure is able to be implemented with user assistance or automatically without user involvement.

In operation, the point cloud coding structure more efficiently encodes 3D content. A point cloud coding structure defines a "key" point cloud frame, where all references used for predicting point cloud patches are limited to the current point cloud frame. A point cloud patch buffer includes the list of reference patches, and their respective bounding boxes from a point cloud frame are stored to be used for prediction of patches in another frame. The list of reference patches may contain patches from the past and patches from the future, in case the coding order of point cloud frames is allowed to be different from the presentation order, and bi-directional prediction is used. A similar reference buffer list concept is able to be applied to the layers of the point cloud. A signaling method that correlates the blocks of V-PCC by signaling within the payload the reference to the ID of the block containing the higher-level information is also described. These implementations improve efficiency of the encoding.

Some Embodiments of a Point Cloud Coding Structure

1. A method programmed in a non-transitory memory of a device comprising:
   implementing a point cloud coding structure; and
   encoding point cloud metadata using the point cloud coding structure.
2. The method of clause 1 wherein implementing the point cloud coding structure includes determining key point cloud frames which do not depend on any other frames for prediction.
3. The method of clause 1 wherein encoding the point cloud metadata utilizes bi-directional prediction, wherein bi-direction prediction includes using past patch and metadata information and future patch and metadata information.
4. The method of clause 3 wherein bi-directional prediction implements two separate structures, a first structure for the past patch and metadata information, and a second structure for the future patch and metadata information.
5. The method of clause 1 wherein the first structure and the second structure are stored in a point cloud patch buffer.
6. The method of clause 1 further comprising utilizing a buffer list for layers of the point cloud to enable points of a point cloud to be projected on top of each other.
7. The method of clause 1 further comprising implemented a signaling method to correlate blocks of V-PCC.
8. An apparatus comprising:
   a non-transitory memory for storing an application, the application for:
     implementing a point cloud coding structure; and
     encoding point cloud metadata using the point cloud coding structure; and
   a processor coupled to the memory, the processor configured for processing the application.
9. The apparatus of clause 8 wherein implementing the point cloud coding structure includes determining key point cloud frames which do not depend on any other frames for prediction.
10. The apparatus of clause 8 wherein encoding the point cloud metadata utilizes bi-directional prediction, wherein bi-direction prediction includes using past patch and metadata information and future patch and metadata information.
11. The apparatus of clause 10 wherein bi-directional prediction implements two separate structures, a first structure for the past patch and metadata information, and a second structure for the future patch and metadata information.
12. The apparatus of clause 8 wherein the first structure and the second structure are stored in a point cloud patch buffer.
13. The apparatus of clause 8 further comprising utilizing a buffer list for layers of the point cloud to enable points of a point cloud to be projected on top of each other.
14. The apparatus of clause 8 further comprising implemented a signaling method to correlate blocks of V-PCC.
15. A system comprising:
    a point cloud coding structure; and
    an encoder for encoding point cloud metadata using the point cloud coding structure.
16. The system of clause 15 wherein implementing the point cloud coding structure includes determining key point cloud frames which do not depend on any other frames for prediction.
17. The system of clause 15 wherein encoding the point cloud metadata utilizes bi-directional prediction, wherein bi-direction prediction includes using past patch and metadata information and future patch and metadata information.
18. The system of clause 17 wherein bi-directional prediction implements two separate structures, a first structure for the past patch and metadata information, and a second structure for the future patch and metadata information.
19. The system of clause 15 wherein the first structure and the second structure are stored in a point cloud patch buffer.
20. The system of clause 15 further comprising utilizing a buffer list for layers of the point cloud to enable points of a point cloud to be projected on top of each other.
21. The system of clause 15 further comprising implemented a signaling method to correlate blocks of V-PCC.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method programmed in a non-transitory memory of a device comprising:
   implementing a point cloud coding structure; and
   encoding point cloud metadata using the point cloud coding structure, wherein encoding the point cloud metadata utilizes bi-directional prediction, wherein bi-directional prediction includes using past patch and metadata information and future patch and metadata information, wherein bi-directional prediction implements two separate structures for a reference patch list, a first structure for the past patch and metadata information, and a second structure for the future patch and metadata information, wherein encoding the point cloud metadata includes re-ordering frames to enable a patch to refer to patches in the past and the future, utilizing a buffer list for layers of the point cloud to enable points of the point cloud to be projected on top of each other, wherein the layers are limited to a maximum of two layers, where a first layer is a first point and a second layer is a last point, and any points in between are not encoded.

2. The method of claim 1 wherein implementing the point cloud coding structure includes determining key point cloud frames which do not depend on any other frames for prediction.

3. The method of claim 1 wherein the first structure and the second structure are stored in a point cloud patch buffer.

4. The method of claim 1 further comprising utilizing a buffer list for layers of the point cloud to enable points of a point cloud to be projected on top of each other.

5. The method of claim 1 further comprising implemented a signaling method to correlate blocks of V-PCC.

6. An apparatus comprising:
a non-transitory memory for storing an application, the application for:
implementing a point cloud coding structure; and
encoding point cloud metadata using the point cloud coding structure, wherein encoding the point cloud metadata utilizes bi-directional prediction, wherein bi-directional prediction includes using past patch and metadata information and future patch and metadata information, wherein bi-directional prediction implements two separate structures for a reference patch list, a first structure for the past patch and metadata information, and a second structure for the future patch and metadata information, wherein encoding the point cloud metadata includes re-ordering frames to enable a patch to refer to patches in the past and the future, utilizing a buffer list for layers of the point cloud to enable points of the point cloud to be projected on top of each other, wherein the layers are limited to a maximum of two layers, where a first layer is a first point and a second layer is a last point, and any points in between are not encoded; and
a processor coupled to the memory, the processor configured for processing the application.

7. The apparatus of claim 6 wherein implementing the point cloud coding structure includes determining key point cloud frames which do not depend on any other frames for prediction.

8. The apparatus of claim 6 wherein the first structure and the second structure are stored in a point cloud patch buffer.

9. The apparatus of claim 6 further comprising utilizing a buffer list for layers of the point cloud to enable points of a point cloud to be projected on top of each other.

10. The apparatus of claim 6 further comprising implemented a signaling method to correlate blocks of V-PCC.

11. A system comprising:
a point cloud coding structure; and
an encoder for encoding point cloud metadata using the point cloud coding structure, wherein encoding the point cloud metadata utilizes bi-directional prediction, wherein bi-directional prediction includes using past patch and metadata information and future patch and metadata information, wherein bi-directional prediction implements two separate structures for a reference patch list, a first structure for the past patch and metadata information, and a second structure for the future patch and metadata information, wherein the metadata information comprises temporal correlation information, wherein the reference patch list is generated from a predefined reference auxiliary information set for implementing flexible prediction, wherein encoding the point cloud metadata includes re-ordering frames to enable a patch to refer to patches in the past and the future, wherein the encoder is further configured for utilizing a buffer list for layers of the point cloud to enable points of the point cloud to be projected on top of each other, wherein the layers are limited to a maximum of two layers, where a first layer is a first point and a second layer is a last point, and any points in between are not encoded.

12. The system of claim 11 wherein implementing the point cloud coding structure includes determining key point cloud frames which do not depend on any other frames for prediction.

13. The system of claim 11 wherein the first structure and the second structure are stored in a point cloud patch buffer.

14. The system of claim 11 further comprising implemented a signaling method to correlate blocks of V-PCC.

* * * * *